United States Patent [19]

Ricouard et al.

[11] 4,086,533

[45] Apr. 25, 1978

[54] HALL EFFECT APPARATUS FOR DETERMINING THE ANGULAR POSITION OF A ROTATING PART

[75] Inventors: Jean-Pierre Ricouard, Suresnes; Bruno Schorter, Morsang, Orge, both of France

[73] Assignee: U.S. Philips Corporation, New York, N.Y.

[21] Appl. No.: 740,004

[22] Filed: Nov. 8, 1976

[30] Foreign Application Priority Data

Nov. 12, 1975 France .................................. 75 34439

[51] Int. Cl.² .......................................... G01R 33/12
[52] U.S. Cl. .................................. 324/208; 338/32 H; 310/168; 310/DIG. 3
[58] Field of Search ................... 324/34 D, 34 PS, 45, 324/46; 338/32 R, 32 H; 323/94 H; 310/68 B, 111, 168

[56] References Cited

U.S. PATENT DOCUMENTS

| 3,179,856 | 4/1965 | Kuhrt et al. | 324/45 |
|---|---|---|---|
| 3,226,631 | 12/1965 | Kuhrt et al. | 324/45 |
| 3,239,786 | 3/1966 | Shang | 338/32 H |
| 3,366,909 | 1/1968 | Hini et al. | 324/45 |
| 3,777,273 | 12/1973 | Baba et al. | 324/34 PS |

FOREIGN PATENT DOCUMENTS

| 442,819 | 1/1968 | Switzerland | 324/34 D |
|---|---|---|---|
| 974,516 | 11/1964 | United Kingdom | 324/45 |

OTHER PUBLICATIONS

Brann et al., Magnetic Polarity Reversal for Hall Effect Control Device, IBM Tech. Bull., vol. 14, No. 6, Nov. 1971, pp. 1855-1856.

*Primary Examiner*—Robert J. Corcoran
*Attorney, Agent, or Firm*—Frank R. Trifari; Bernard Franzblau

[57] ABSTRACT

A device for determining the angular position of a rotating part includes first and second parallel arranged magnets forming a symmetric magnetic excitation circuit with a Hall-effect element disposed on the axis thereof. The rotating part has first and second elements made of a soft magnetic material which are angularly displaced so as to alternately pass by the first and second magnets, respectively, to produce first and second oppositely directed transverse magnetic field components, H, at the Hall-effect element which thereby generates a signal whose polarity reverses to indicate angular position of the rotating part.

7 Claims, 7 Drawing Figures

HALL EFFECT APPARATUS FOR DETERMINING THE ANGULAR POSITION OF A ROTATING PART

The present invention relates to a method of detecting the position of moving parts, in particular angular positions of rotating parts, with the aid of a Hall-effect crystal.

The invention also relates to devices for carrying out the method in accordance with the invention.

Devices for detecting specific angular positions of a component, such as the flywheel of an internal combustion engine, are already known. Such a device is described in the published French patent application No. 2,245,930 filed on July 26, 1973.

In the device described in said patent application the sensitive element consists of a magneto-resistance element or a Hall-effect element which is disposed in the field of a magnet. The variations of the magnetic excitation field of the sensitive element are produced by slots formed in a magnetic material at the periphery of the rotating part of which specific angular positions are to be detected, which correspond to the positions in which said slots pass the sensitive element.

The variations in the value of the magnetic excitation field of the sensitive element are not very large so that the variation of the Hall-voltage, or the variation of the magneto-resistance, is small (a variation of a few percent of the resistance in accordance with the previously cited patent application).

Under such conditions the resulting effective signal is also very small, which has an adverse effect on the precision of the positional information. Furthermore, spurious signals or small induced signals will soon lead to a poor signal-to-noise ratio.

It is an object of the invention to eliminate these drawbacks and to provide a means of detecting specific positions of moving parts, in particular specific angular positions of rotating parts, by means of a large signal and with a high precision.

The invention is based on the recognition that, generally speaking the change in polarity of a signal, as a function of time constitutes a far more significant indication than a small variation of the amplitude of said signal.

In accordance with the invention the method of detecting the position of moving parts, in particular angular positions of rotating parts, with the aid of a Hall-effect crystal, is characterized in that to the moving part whose passage through specific positions is to be detected accurately, an auxiliary component is connected which comprises soft-magnetic projecting elements whose movement in the proximity of the Hall-effect crystal at the instants which correspond to said specific positions results in a reversal of the direction of the active component of the magnetic excitation field of the Hall-effect crystal, which field is produced by a fixed magnetic excitation circuit.

Also in accordance with the invention are devices for detecting the position of moving parts, in particular specific angular positions of rotating parts with the aid of a Hall-effect crystal, comprising a fixed magnetic exciting circuit for the Hall-effect crystal, provided with at least one permanent magnet and a soft-magnetic part, which is at least partly connected to the moving part and which influences the magnetic field produced by the magnetic exciting circuit at the location of the Hall-effect crystal. The novel devices are characterized in that the magnetic excitation circuit is symmetrical and is constituted by two identical permanent magnets which are disposed at a small distance from each other. The magnets have front poles (of like magnetic polarity) disposed in the proximity of the Hall-effect crystal. The Hall-effect crystal is disposed substantially in the plane of symmetry of the magnetic excitation circuit. The soft-magnetic part, which (at least partly) influences the magnetic field produced by the magnetic excitation circuit of the Hall-effect crystal, comprises projecting soft-magnetic elements which extend from the body of said part and which pass said two magnets in the proximity of their front poles. One projecting element, which passes one of the magnets near the front pole, is followed by a projecting element which passes the other magnet near the front pole.

From the article entitled "Kontaktloser Signalgeber" in "Elektrotechnische Zeitschrift," 83A, no. 11, of May 21, 1962, pages 367-372 by H. J. Lippmann, it is known per se for detecting the position of moving parts to employ a Hall-effect crystal equipped with a fixed magnetic exciting circuit for said crystal, comprising two identical permanent magnets disposed at a small distance from each other and substantially parallel to each other, whose front poles of like magnetic polarity are disposed in the proximity of the Hall-effect crystal, which crystal is disposed on the axis of symmetry of the magnetic excitation system.

However, in the devices in accordance with the invention the active component of the magnetic excitation field (the component which is perpendicular to the plane of the Hall-effect crystal) changes from a value $+H$ to a value $-H$ at the instant at which, owing to the movement (for example a rotation) of the movable soft-magnetic part, one projecting element which passes one of the two magnets near the front pole at least partly, takes the place of another projecting element which passes the other magnet near the front pole. This results in the polarity of the Hall voltage across the Hall-effect crystal being reversed at the same instant, which constitutes a far more accurate datum than a small variation of the absolute value of said Hall voltage.

After appropriate amplification of the Hall voltage it is possible to use said voltage for controlling the position of equilibrium of a trigger arrangement whose trigger moment is a very accurate indication of the particular position, as a function of time, of the moving part which influences the magnetic field at the location of the Hall-effect crystal.

In accordance with a suitable embodiment of a device for carrying out the method in accordance with the invention, the axes of the permanent magnets which are used are substantially parallel and the front poles of said magnets are completed by a separate flat and comparatively thin pole piece made of a soft-magnetic material of high permeability, such as soft iron.

Such an arrangement provides an increase in the value of the effective component of the magnetic field so that the peak-to-peak amplitude of the signal which results from the Hall voltage increases.

In accordance with a suitable variant of the embodiment described hereinbefore, the individual flat, comparatively thin, pole pieces have a width which is slightly smaller than the width of the pole which they complete and their (facing) inner edges are substantially aligned relative to the (facing) inner walls of the magnets with which they co-operate. Such an arrangement permits the Hall-effect crystal to be slightly removed from the front plane of the pole pieces, while maintaining a high value of the effective component of the magnetic field. As a result, realizing devices in accordance with the invention is substantially facilitated and it is much easier to provide mechanical protection of the Hall-effect device, for example, by arranging it slightly retracted between the two magnets, in an encapsulation of a synthetic resin, by means of which the magnetic excitation circuit and the Hall-effect crystal of a device in accordance with the invention are assembled and protected.

The following description with reference to the accompanying drawings, which are given by way of non-limitative example, will enable the invention to be more fully understood.

Figure 1:
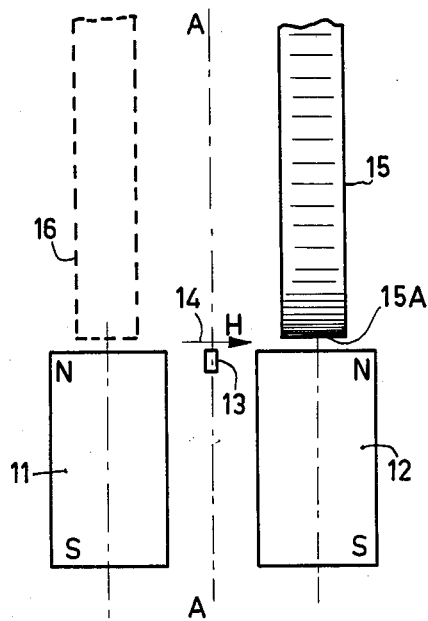
FIG. 1 is a schematic elevation of an embodiment of a device for carrying out the method in accordance with the invention.
Figure 5:
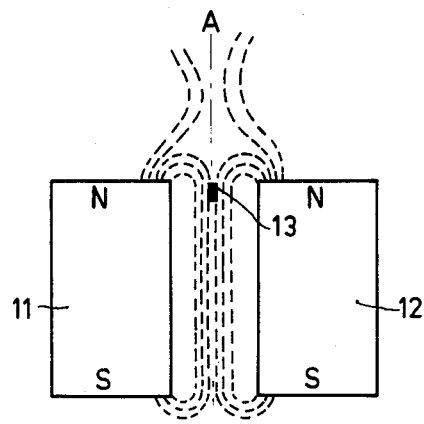

FIG. 5 in simplified form represents the lines of force of the magnetic fields of the two magnets which are identical to those of the device of FIG. 1, in the absence of the magnetic element which disturbes the pattern of the magnetic field.

Figure 6:
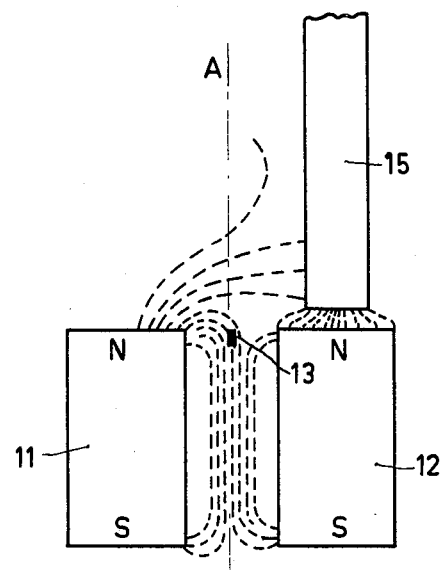
Figure 7:
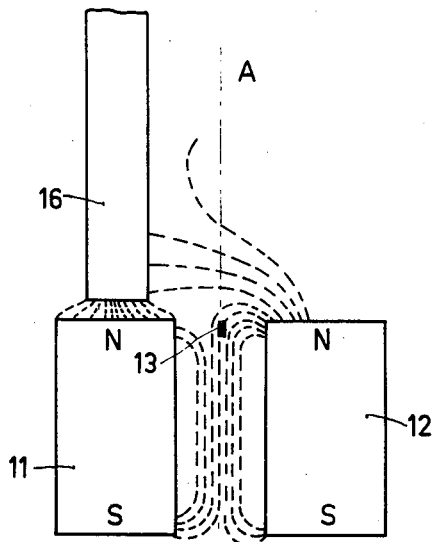

FIGS. 6 and 7 in simplified form represent the lines of force of the magnetic field of the magnets of FIG. 5 in the presence of a disturbing magnetic element which is disposed above the right-hand magnet (FIG. 6) and above the left-hand magnet (FIG. 7).

The device in accordance with the invention shown in FIG. 1 comprises a magnetic excitation circuit which is constituted by two permanent magnets 11 and 12 whose axes are substantially parallel and whose cross-section is either square or rectangular. The two magnets 11 and 12 are magnetized in their longitudinal direction, their directions of magnetization being the same. FIG. 1 shows two magnets whose front poles are north poles, but these poles may equally be two south poles.

A small Hall-effect crystal 13 is disposed substantially on the axis of the magnetic excitation circuit. The plane of said crystal is perpendicular to the plane of the Figure and the crystal 13 is consequently sensitive to any transverse component of the magnetic field which is oriented in the direction of the arrow 14 or in the opposite direction.

The end of a projecting element which belongs to a rotating part and which influences the magnetic field produced by the magnetic excitation circuit at the location of the Hall-effect crystal is designated 15.

The projecting element 15 in FIG. 1 is viewed at its thickness and extends in a plane which is perpendicular to the plane of the Figure. The radius of the rim 15A of the projecting element 15 is large relative to the dimensions of the north pole of the magnet 12.

Figure 4:
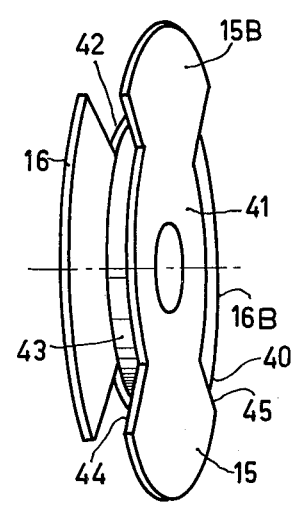
FIG. 4 is a perspective view of an example of a rotating part, which is at least partly made of a soft-magnetic material of high permeability, which influences the magnetic field produced by the magnetic exciting circuit at the location of the Hall-effect crystal.

When the rotating part is moved through a specific angle the projecting element 15 no longer faces the north pole of the magnet 12 and another projecting element 16 will take up the position, represented by the dashed lines, opposite the magnet 11. The trailing edge of the projecting element 15 is in the same angular position as the leading edge of the projecting element 16, as can be seen in FIG. 4.

In the absence of a magnetic element which disturbs the pattern of the lines of force of the magnetic fields resulting from the magnetic flux produced by the permanent magnets 11 and 12 and taking into account the symmetry of the magnetic excitation circuit and the axial position of the Hall-effect crystal 13, the magnetic field at the location of the Hall-effect crystal will be a longitudinal magnetic field which is oriented in accordance with the axis of symmetry of the magnetic circuit. This magnetic field is in fact the resultant of two equal symmetrical elementary fields, which are equally inclined relative to the axis of symmetry AA of the magnetic excitation circuit, so that the longitudinal components augment each other and the transverse components cancel each other, thus providing the resultant field.

FIG. 5, in which only the principal lines of force are shown, shows some of the lines of force of the magnetic fields resulting from the magnetic flux produced by the permanent magnets 11 and 12 in the absence of a disturbing magnetic element and the compensation mechanism for the transverse components of the magnetic fields produced by the magnets 11 and 12 in accordance with the axis AA of the magnetic excitation circuit is clearly visible.

If a disturbing magnetic element is present, such as that constituted by the projecting element 15 whose rim 15A is disposed in the proximity of the north pole of the magnet 12, the pattern of the lines of force of the magnetic fields of the magnets 11 and 12 is substantially modified, as is visible in FIG. 6, and the symmetry of the lines of force as a result of which the transverse components of the magnetic field are suppressed for the points situated on the axis AA, is disturbed distinctly, in particular in the space between the north poles of the magnets 11 and 12. At this instant the disturbing element 15 in fact constitutes a collecting element for a substantial part or even the total magnetic flux emanating from the north pole surface of the magnet 12 and the lines of force of the magnetic field emanating from the right-hand edge of the pole face of the magnet 11 and the upper part of the right-hand side of said magnet, extend beyond the axis AA, as a result of which a substantial transverse component of the magnetic field appears at the location of the Hall-effect crystal 13, which is oriented in the direction of the arrow 14.

Certain lines of force emanating from the north pole of the magnet 11 close up again at the south pole of the magnet 12.

When, owing to the rotary movement of the part which includes the disturbing projecting elements, a projecting element 16 takes the place of the other disturbing element 15, which element 16 is disposed opposite to north pole of the magnet 11 as is shown in FIG. 7, the magnetic flux emitted by the north-pole surface of the magnet 11 is collected by the disturbing element 16 and this disturbing mechanism, which is identical to that shown in FIG. 6, then causes a substantial transverse magnetic-field component to appear at the location of the Hall-effect crystal 13, whose direction is opposite to the direction of the arrow 14.

Thus, it is evident that, when the rotation of a part as shown in FIG. 4 results in a projecting element such as the element 15 (disposed opposite the front pole of the magnet 12) to take the place of a projecting element such as the element 16 (which is disposed opposite the front pole of the magnet (11), the direction of the transverse component of the magnetic field H at the location of the Hall-effect crystal 13 is reversed.

Thus, the rotation of a part as shown in FIG. 4 results in a number of successive reversals of the polarity of the Hall voltage which appears across the transverse terminals of the Hall-effect crystal, which successive reversals constitute very precise indications of the corresponding positions (as a function of time) of the rotating part.

In the case of the part of FIG. 4 the substitution of the disturbing element 15 (opposite the north pole of the magnet 12) by the disturbing element 16 (opposite the north pole of the magnet 11) is the result of the rotation of the part about an axis which is situated in the plane of the Figure. This substitution can also be the result of the rotation of a part about an axis which is perpendicular to the plane of the Figure and provided with teeth in the same way as a gear wheel, said part may in fact be a gear wheel.

Figure 2:
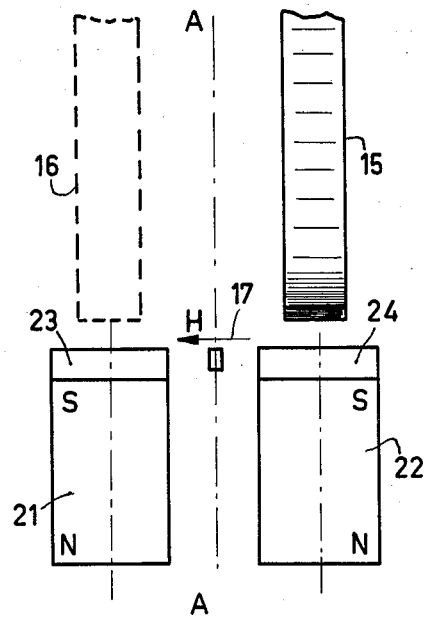
FIG. 2 is a schematic elevation of another embodiment in which the magnets of the magnetic excitation circuit are provided with flat pole pieces.

The device in accordance with the invention, which is schematically shown in FIG. 2, comprises a magnetic excitation circuit which is constituted by two permanent magnets 21 and 22 which are completed by flat comparatively thin pole pieces 23 and 24 respectively of a soft-magnetic material of high permeability such as soft iron, whose cross-section has the same dimensions as the cross-section of the magnets 21 and 22. The pole pieces 23 and 24 are suitably fixed to the poles of the magnet 21 and 22 by gluing, for example with an epoxy-resin glue.

The axes of the magnets 21 and 22 are substantially parallel and said magnets are of course magnetized in their longitudinal direction, the pole pieces being disposed on poles of like magnetic polarity, i.e., south poles in the example of FIG. 2.

As a result, when the projecting element 15 faces the pole piece 24, the magnetic field H existing at the location of the Hall-effect crystal 13 will be oriented in accordance with the arrow 17, in a direction which is opposite to the direction of the arrow 14 of FIG. 1.

The presence of the pole pieces 23 and 24 results in an increasing transverse magnetic field H at the location of the Hall-effect crystal 13, which yields an increase in the amplitude of the signal which is available at the connecting terminals of the Hall-effect crystal.

Figure 3:
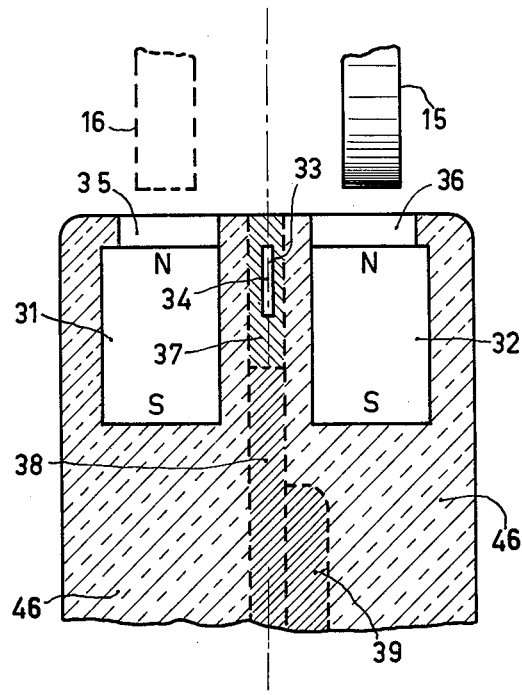
FIG. 3 is a schematic elevation of a variant of the embodiment of the device in accordance with the invention shown in FIG. 2.

The device in accordance with the invention, which is schematically shown in FIG. 3, comprises a magnetic excitation circuit consisting of two permanent magnets 31 and 32 which are completed by comparatively thin pole pieces 35 and 36 whose width is slightly smaller than the width of the pole which they complete and whose inner edges (which face each other) are substantially in line with the inner walls (which face each other) of the magnets with which they co-operate. The two magnets 31 and 32 are substantially parallel and are magnetized in the same way in their longitudinal direction. FIG. 3 shows two magnets whose front poles are north poles, but these two poles may equally be south poles.

For the Hall-effect crystal 33 it is advantageous to use a semiconductor crystal which forms part of an integrated circuit of the TCA 450A type which, in addition to the Hall-effect crystal, comprises a differential preamplifier which amplifies the Hall voltage at the terminals of the crystal 33. This integrated circuit, which is designated 34, is capsulated in a small flat plastics block 37, which in its turn is accommodated in a recess formed in a thin insulating plate 38 on which an amplifier 39, which takes the form of a minature printed circuit, is accommodated.

The magnetic excitation circuit, the integrated circuit TCA 450A and the amplifier 39 accommodated on the p.c. board 38 are together encapsulated in a block 46 of a synthetic resin, which is preferably an epoxy resin, to which aluminum oxide powder has been added so as to improve the thermal conductivity, and which is subsequently tinted. The parts 15 and 16 are suitably constituted by the projecting elements of the part shown in FIG. 4.

In the example of FIG. 4 a part 40 is shown which is obtained by mounting two identical elementary parts 41 and 42 on a spacer 43.

The part 41 comprises two symmetrical projecting elements 15 and 15B whose circular edges cover an angle of 90° degrees and which are connected to the central round portion of the part 41 by radial edges such as 44 and 45.

The part 42, which is identical to the part 41, comprises symmetrical projecting elements 16 and 16B, whose axes make an angle of 90° with the axes of the projecting elements 15 and 15B of part 41, as a result of which the radial edges of the projecting elements 15, 16, 15B and 16B coincide pairwise in respect of their angles.

The parts 41 and 42 are for example obtained by cutting them from a soft-iron plate of suitable thickness. The spacer 43 may be magnetic (for example of soft-iron) or non-magnetic (for example of aluminum). Depending on the nature of the material of spacer 43, the parts can be assembled by, for example, electric spot welding or by riveting.

The part 40 shown in FIG. 4 is destined for producing four reversals of the polarity of the Hall voltage per revolution of the shaft on which said part is mounted, which for example corresponds to the positions in which the top dead centres are reached at the end of the compression strokes of the four pistons of a four-stroke four-cylinder engine, when the part 40 rotates with the cam shaft of said engine at half the speed.

Depending on its use the part 40 may have a construction and a number of projecting elements other than as shown in FIG. 4. For the same application, in the case of a part which is mounted directly on the crank shaft of the relevant engine, the parts corresponding to the parts 41 and 42 may have a single projecting element which covers an angle of 180° instead of an angle of 90°.

Obviously, the construction of the part 40 of FIG. 4 may readily be adapted to provide the desired information as a function of the angular setting of specific positions which are to be detected with the necessary precision.

Purely by way of indication it is to be noted that when two magnets are used made of a ceramic material having the trade name FERROXDURE, with a square cross-section of 4 × 4 mm, a length of 6 mm and a mutual distance of 3 mm, completed by soft-iron pole pieces of 4 × 3.5 mm and a thickness of 1 mm at the location of the Hall-effect crystal of an integrated circuit TCA 450A, a transverse magnetic-field component of approximately 800 A/m (or 100 oersteds) is obtained whose direction is reversed at the instant at which a "left-hand" disturbing magnetic element takes the place of a "right-hand" disturbing magnetic element, or vice versa.

What is claimed is:

1. A device for detecting the specific angular positions of a rotating part comprising, a Hall-effect crystal, a fixed magnetic circuit for exciting the Hall-effect crystal which circuit includes two identical permanent magnets which are disposed at a small distance from and substantially parallel to each other and having adjacent poles of like magnetic polarity situated in proximity to the Hall-effect crystal to apply a magnetic excitation field thereto, said fixed magnetic circuit having an axis of symmetry along which the crystal is disposed, said rotating part including first and second soft-magnetic elements respectively located on opposite sides of said axis of symmetry and each having a leading end and a trailing end defined by the direction of travel of the rotating part, said first and second soft magnetic elements being relatively displaced so that the trailing end of one soft magnetic element coincides with the leading end of the other soft magnetic element and movement of the rotating part causes said first and second soft magnetic elements to successively and alternately pass in the proximity of said adjacent poles, a first soft-magnetic element which passes one of the magnets near its said adjacent pole being immediately followed by a second soft-magnetic element which passes the other magnet near its said adjacent pole to cause a reversal in the direction of the active component of the magnetic excitation field whereby the Hall-effect cyrstal responds by reversing the polarity of an output signal generated therein.

2. A device as claimed in claim 1 further comprising an auxiliary part from which the soft magnetic elements project from the body of said auxiliary part.

3. A device as claimed in claim 1 further comprising a printed circuit board, a preamplifier coupled to the Hall-effect crystal, the Hall-effect crystal and the preamplifier forming a part of an integrated circuit mounted to the printed circuit board, the fixed magnetic circuit and the printed circuit board with crystal and preamplifier being encapsulated in a block of a synthetic resin to which aluminum oxide powder is added and which is tinted.

4. A device for detecting the position of a moving part comprising, a Hall-effect crystal for generating an output voltage dependent upon an active component of a magnetic field in which the crystal is located, a fixed magnetic circuit for exciting the Hall-effect crystal and comprising first and second magnetic members symmetrically disposed so as to define a gap between adjacent ends thereof and an axis of symmetry in said gap, said adjacent ends defining magnetic poles of like polarity with said Hall-effect crystal disposed in said gap and subject to a magnetic excitation field produced therein by said first and second magnetic members, said moving part including first and second soft magnetic elements respectively located on opposite sides of said axis of symmetry and each having a leading end and a trailing end defined by the moving part, said first and second soft magnetic elements being relatively displaced so that the trailing end of one soft magnetic element coincides with the leading end of the other soft magnetic element and movement of the moving part causes said first and second soft magnetic elements to successively and alternately pass in proximity to said first and second magnetic members, the alternate passage of said soft magnetic elements past said first and second magnetic members causing a reversal in the direction of the active component of the magnetic excitation field acting upon the Hall-effect crystal which responds by generating an output voltage with a zero crossing which provides an indication of the position of the moving part.

5. A device as claimed in claim 4 wherein said first and second magnetic members comprise first and second permanent magnets spaced apart and in parallel having adjacent pole ends of like polarity and with the Hall-effect crystal located along said axis of symmetry and in the vicinity of said adjacent pole ends.

6. A device as claimed in claim 4 wherein said moving part is rotatable about an axis that is parallel to the active component of the gap magnetic field in the vicinity of the Hall-effect crystal and said first and second soft magnetic elements are axially displaced relative to one another along the axis of rotation.

7. A device as claimed in claim 4 wherein said moving part comprises a rotatable member and said first and second soft magnetic elements each have a pair of circular peripheral edge portions of at most 90° each and with the circular peripheral edge portions of the first and second soft magnetic elements circumferentially displaced.

* * * * *